US010703202B2

(12) United States Patent
Funderburg et al.

(10) Patent No.: US 10,703,202 B2
(45) Date of Patent: Jul. 7, 2020

(54) DRIVE AXLE ASSEMBLY WITH CLUTCH COLLAR (71) Applicant: ArvinMeritor Technology, LLC, Troy, MI (US)

(72) Inventors: Derek Funderburg, Lakeport, CA (US); Pedro Garcia, Clarkston, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 266 days.

(21) Appl. No.: 15/894,018

(22) Filed: Feb. 12, 2018

(65) Prior Publication Data
US 2019/0248234 A1    Aug. 15, 2019

(51) Int. Cl.
| *B60K 17/36* | (2006.01) |
| *B60K 23/04* | (2006.01) |
| *F16H 48/08* | (2006.01) |
| *F16H 37/08* | (2006.01) |
| *F16H 48/20* | (2012.01) |
| *F16H 48/10* | (2012.01) |
| *B60K 23/08* | (2006.01) |
| *B60K 17/16* | (2006.01) |

(52) U.S. Cl.
CPC ............ *B60K 17/36* (2013.01); *B60K 17/16* (2013.01); *B60K 23/04* (2013.01); *B60K 23/08* (2013.01); *B60K 23/0808* (2013.01); *F16H 37/0813* (2013.01); *F16H 48/08* (2013.01); *F16H 48/10* (2013.01); *F16H 48/20* (2013.01); *B60K 2023/046* (2013.01); *B60K 2023/0858* (2013.01)

(58) Field of Classification Search
CPC .......... F16H 48/08; F16H 48/10; F16H 48/20; B60K 17/36; B60K 17/16; B60K 23/04; B60K 23/08; B60K 23/0808; B60K 2023/046

See application file for complete search history.

(56) References Cited

U.S. PATENT DOCUMENTS

| 5,885,182 | A | 3/1999 | Forsyth | |
| 7,059,215 | B1 | 6/2006 | Ziech | |
| 7,211,017 | B2 | 5/2007 | Green et al. | |
| 7,291,083 | B2 | 11/2007 | Almaguer | |
| 8,651,994 | B2 | 2/2014 | Bassi et al. | |
| 9,457,656 | B2* | 10/2016 | Ziech | B60K 17/3467 |
| 2003/0203783 | A1 | 10/2003 | Sullivan | |
| 2016/0131240 | A1 | 5/2016 | Cooper | |
| 2016/0341260 | A1* | 11/2016 | Hirao | F16C 3/02 |
| 2016/0369879 | A1 | 12/2016 | Martin | |

OTHER PUBLICATIONS

European Patent Office, Extended European Search Report for corresponding European Application No. 19184750.8-1012, dated Oct. 8, 2019.

\* cited by examiner

*Primary Examiner* — Edwin A Young
(74) *Attorney, Agent, or Firm* — Brooks Kushman PC (57) ABSTRACT An axle assembly that may include a housing assembly, a case, an interaxle differential unit, drive pinion, and an output shaft. The axle assembly may further include a clutch collar that is moveable between a first position and a second position to engage and disengage a rotatably drivable member and the drive pinion.

20 Claims, 11 Drawing Sheets

DRIVE AXLE ASSEMBLY WITH CLUTCH COLLAR

TECHNICAL FIELD

This disclosure relates to a drive axle assembly for a vehicle, and more particularly, to a drive axle assembly having a clutch collar.

BACKGROUND

A drive axle assembly is disclosed in U.S. Pat. No. 8,651,994.

SUMMARY

In at least one approach, an axle assembly is provided. The axle assembly may include a housing assembly, a case, and an interaxle differential unit. The case may be disposed in the housing assembly and may be rotatable about a first axis. The interaxle differential unit may be disposed in the case and may have a rotatably drivable member. The axle assembly may further include a drive pinion and an output shaft. The drive pinion may be selectively connected to the interaxle differential unit and may be configured to provide torque to a differential assembly. The output shaft that may be received in the drive pinion and may be operatively connected to the interaxle differential unit. The axle assembly may further include a clutch collar that may be moveable along the first axis between a first position and a second position. In the first position, the rotatably drivable member may be rotatable with respect to the case, and the rotatably drivable member and drive pinion may be configured to rotate together about the first axis. In the second position, the rotatably drivable member may not be rotatable with respect to the case, and the rotatably drivable member and the case may be rotatable with respect to the drive pinion.

In at least one approach, an axle assembly is provided. The axle assembly may include a housing assembly, a case, and an interaxle differential unit. The case may be disposed in the housing assembly and may be rotatable about a first axis. The interaxle differential unit may be disposed in the case and may have a first side gear. The axle assembly may further include a drive pinion and an output shaft. The drive pinion may be selectively connected to the interaxle differential unit and may be configured to provide torque to a differential assembly. The output shaft that may be received in the drive pinion and may be operatively connected to the interaxle differential unit. The axle assembly may further include a clutch collar that may be moveable along the first axis between a first position and a second position. In the first position, the first side gear may be rotatable with respect to the case, and the first side gear and drive pinion may be configured to rotate together about the first axis. In the second position, the first side gear may not be rotatable with respect to the case, and the first side gear and the case may be rotatable with respect to the drive pinion.

In at least one approach, an axle assembly is provided. The axle assembly may include a housing assembly, a case, and an interaxle differential unit. The case may be disposed in the housing assembly and may be rotatable about a first axis. The interaxle differential unit may be disposed in the case and may have a sun gear. The axle assembly may further include a drive pinion and an output shaft. The drive pinion may be selectively connected to the interaxle differential unit and may be configured to provide torque to a differential assembly. The output shaft that may be received in the drive pinion and may be operatively connected to the interaxle differential unit. The axle assembly may further include a clutch collar that may be moveable along the first axis between a first position and a second position. In the first position, the sun gear may be rotatable with respect to the case, and the sun gear and drive pinion may be configured to rotate together about the first axis. In the second position, the sun gear may not be rotatable with respect to the case, and the sun gear and the case may be rotatable with respect to the drive pinion.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
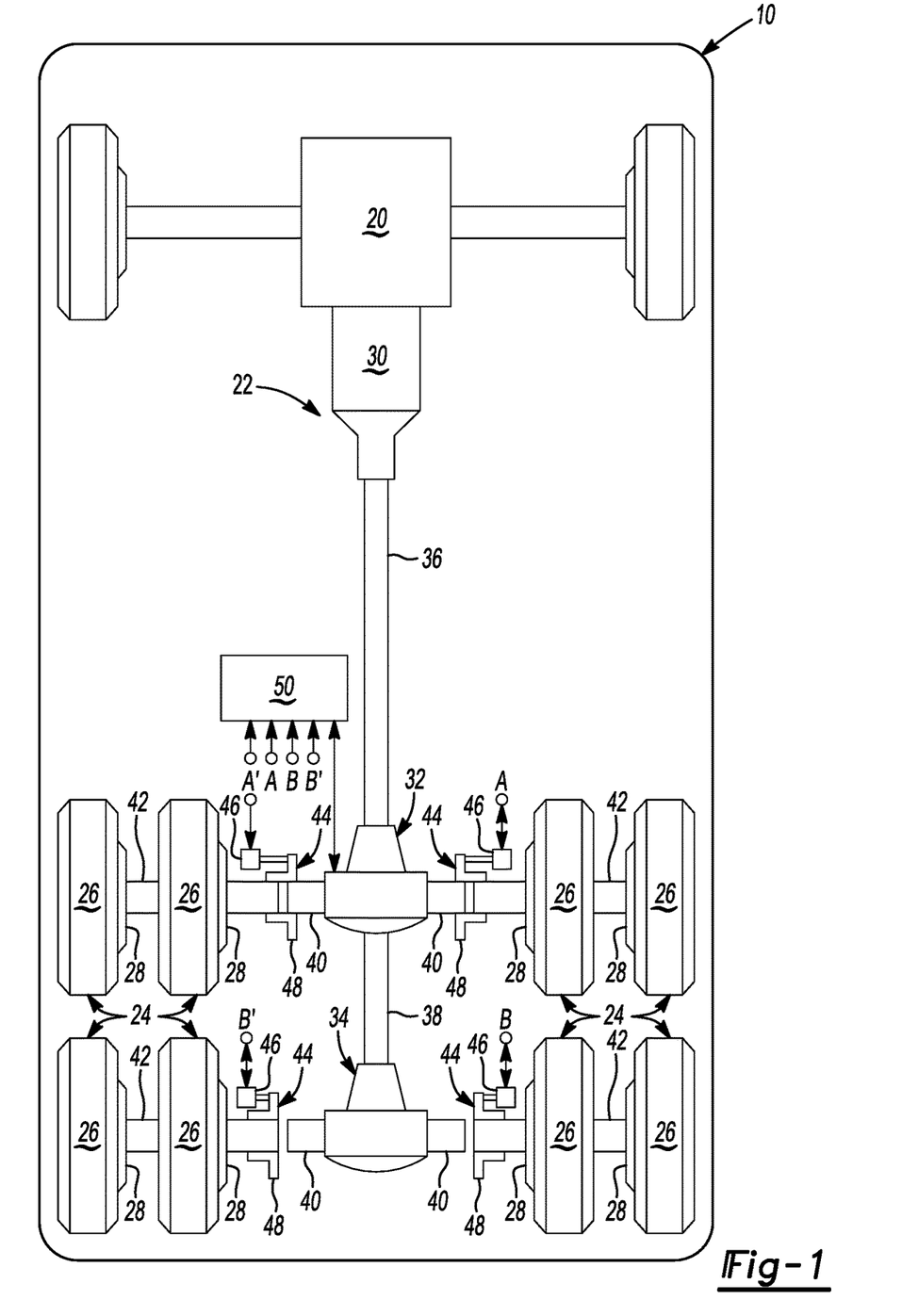
FIG. 1 is a schematic of an exemplary vehicle having an axle assembly.

Referring to FIG. 1, an exemplary vehicle 10 is shown. The vehicle 10 may be of any suitable type, such as a motor vehicle like a truck, bus, farm equipment, military transport or weaponry vehicle, or cargo loading equipment for land, air, or marine vessels. The vehicle 10 may include one or more power sources 20 and a drivetrain 22.

The power source 20 may provide power that may be used to rotate one or more traction wheels. In FIG. 1, a single power source 20 is shown that may be configured as an internal combustion engine that may be adapted to combust any suitable type of fuel, such as gasoline, diesel fuel, or hydrogen. Alternatively, multiple or different power sources may be provided, such as may be employed with a hybrid vehicle or electric vehicle. In such approaches, a power source could be an electric power source, such as a battery, capacitor, or fuel cell, or a non-electric power source, such as a hydraulic power source.

The drivetrain 22 may be driven or powered by one or more power sources 20 and may provide torque to one or more traction wheel assemblies 24 that may include a tire 26 mounted on a wheel 28. The drivetrain 22 may include a transmission 30 and one or more axle assemblies. In the approach shown, a tandem axle configuration is shown that includes a first axle assembly 32 and a second axle assembly 34. The first axle assembly 32 may be referred to as a forward-rear axle assembly. The second axle assembly 34 may be referred to as a rear-rear axle assembly. Optionally, additional axle assemblies may be provided that may be coupled together in series. The power source 20 may be coupled to the input of the transmission 30. An output of the transmission 30 may be coupled to an input of the first axle assembly 32, such as with a drive shaft 36. An output of the first axle assembly 32 may be coupled to an input of the second axle assembly 34 via a prop shaft 38.

The first and second axle assemblies 32, 34 may each have a plurality of outputs that may be coupled to one or more wheel assemblies 24. In the approach shown, the first and second axle assemblies 32, 34 each have a pair of wheel axle output shafts 40. Each wheel axle output shaft 40 may be selectively or non-selectively coupled to a corresponding wheel axle 42 or half-shaft upon which one or more wheel assemblies 24 may be disposed.

A wheel axle disconnect unit 44 may be provided to couple or decouple a wheel axle output shaft 40 from a corresponding wheel axle 42. In at least one exemplary approach, the wheel axle disconnect unit 44 may include an actuator 46 that may be configured to actuate or move a coupling 48 between a first axial position and a second axial position. In the first position, the wheel axle output shaft 40 is coupled to the wheel axle 42 via the coupling 48 to permit torque to be transferred from an axle assembly 32, 34 to a wheel axle 42 and to its associated wheel assemblies 24. In the second axial position, the wheel axle output shaft 40 is disconnected or not coupled to the wheel axle 42 with the coupling 48. As such, torque is not transferred from the axle assembly 32, 34 to a wheel axle 42 or vice versa. For illustration purposes, the wheel axle disconnect units 44 associated with the first axle assembly 32 are shown in the first position while the wheel axle disconnect units 44 associated with the second axle assembly 34 are shown in the second axial position in FIG. 1. Although wheel axle disconnect units 44 are illustrated with both axle assemblies 32, 34, they may be deleted from either or both axle assemblies 32, 34 in one or more approaches. For instance, wheel axle disconnect units 44 may not be provided with the first axle assembly 32 and/or the second axle assembly 34 in one or more approaches. One or more synchronizers may also be provided to facilitate reconnection of the second axle assembly 34 to a wheel axle 42 or the first axle assembly 32 at vehicle speed.

The vehicle 10 may also include a control system 50 that may monitor and control operation of various vehicle systems and components, such as the first axle assembly 32 and the wheel axle disconnect units 44. For example, the control system 50 may communicate with and control the wheel axle disconnect units 44 associated with the first and second axle assemblies 32, 34 as represented by connection nodes A and A' and nodes B and B', respectively. If a wheel axle disconnect unit 44 is not provided with a particular axle assembly 32, 34, the corresponding connection nodes may be omitted.

Figure 2:
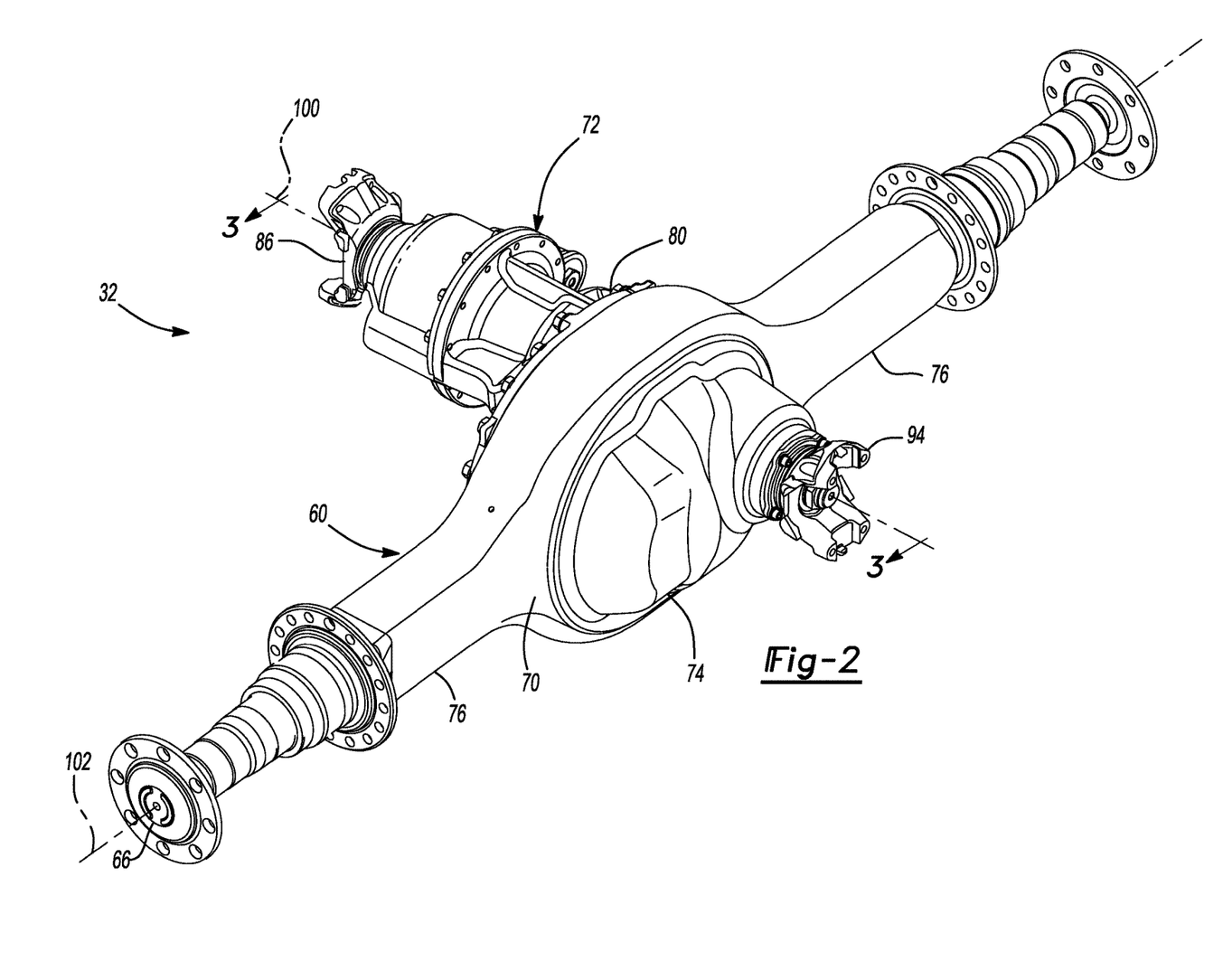
FIG. 2 a perspective view of an axle assembly having a differential carrier that supports a differential assembly.

Referring to FIG. 2, an example of a first axle assembly 32 (referred to hereinafter as axle assembly 32) is shown. As is best shown with reference to FIGS. 2 and 3, the axle assembly 32 may include a housing assembly 60, an interaxle differential assembly 62, a differential assembly 64, and at least one axle shaft 66.

Referring to FIG. 2, the housing assembly 60 may receive various components of the axle assembly 32. In addition, the housing assembly 60 may facilitate mounting of the axle assembly 32 to the vehicle. The housing assembly 60 may include an axle housing 70 and a differential carrier 72.

The axle housing 70 may receive and support the axle shafts 66. In at least one approach, the axle housing 70 may include a center portion 74 and at least one arm portion 76.

The center portion 74 may be disposed proximate the center of the axle housing 70. The center portion 74 may define a cavity that may receive the differential assembly 64. A lower region of the center portion 74 may at least partially define a sump portion that may contain lubricant. Splashed lubricant may flow down the sides of the center portion 74 and may flow over internal components of the axle assembly 32 and gather in the sump portion.

The center portion 74 may include a carrier mounting surface. The carrier mounting surface may face toward and may engage the differential carrier 72. The carrier mounting surface may facilitate mounting of the differential carrier 72 to the axle housing 70. For example, the carrier mounting surface may have a set of holes that may be aligned with corresponding holes on the differential carrier 72. Each hole may receive a fastener, such as a bolt, that may couple the differential carrier 72 to the axle housing 70.

One or more arm portions 76 may extend from the center portion 74. For example, two arm portions 76 may extend in opposite directions from the center portion 74 and away from the differential assembly 64. The arm portions 76 may have substantially similar configurations. For example, the arm portions 76 may each have a hollow configuration or tubular configuration that may extend around the corresponding axle shaft 66 and may help separate or isolate the axle shaft 66 from the surrounding environment. An arm portion 76 or a portion thereof may be integrally formed with the center portion 74. Alternatively, an arm portion 76 may be separate from the center portion 74. In such a configuration, each arm portion 76 may be attached to the center portion 74 in any suitable manner, such as by welding or with one or more fasteners. Each arm portion 76 may define an arm cavity that may receive a corresponding axle shaft 66.

Figure 3:
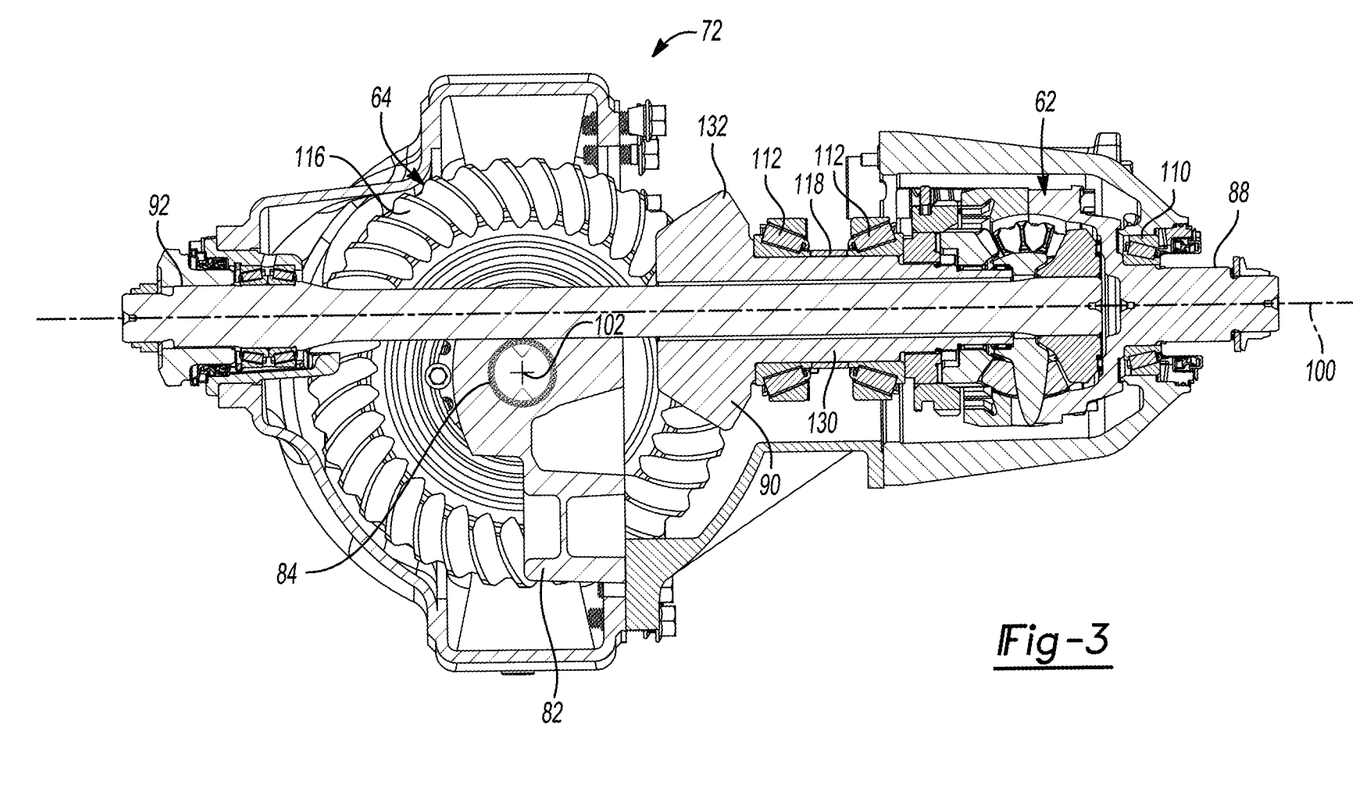
FIG. 3 is a section view of the differential carrier along section line 3-3.

Referring to FIGS. 2 and 3, the differential carrier 72, which may also be called a carrier housing, may be mounted to the center portion 74 of the axle housing 70. The differential carrier 72 may receive the interaxle differential assembly 62 and may support components of the differential assembly 64. The differential carrier 72 may be configured as a single component or as multiple components that are assembled to each other. For instance, the differential carrier may include a first portion that is mounted to the axle housing 70 and a second portion that is mounted to the first portion that may receive the interaxle differential assembly 62. The differential carrier 72 may have a flange portion 80 and one or more bearing supports 82.

Referring to FIGS. 2 and 3, the flange portion 80 may facilitate mounting of the differential carrier 72 to the axle housing 70. For example, the flange portion 80 may be disposed on the carrier mounting surface of the axle housing 70 and may have a set of holes that may receive fasteners as previously discussed.

Referring to FIG. 3, the bearing support 82 may receive a roller bearing assembly 84 that may rotatably support the differential assembly 64. For example, two bearing supports 82 may be received in the center portion 74 and may be located proximate opposite sides of the differential assembly 64. The bearing support 82 may be provided in various configurations. For example, a bearing support 82 may include a pair of legs that extend from the differential carrier 72. A bearing cap may be mounted to the legs and may arch over a roller bearing assembly 84. In such a configuration, the bearing support 82 and bearing cap may cooperate to extend around, receive, and secure the roller bearing assembly 84. As another example, the bearing support 82 may be received in a roller bearing assembly 84 which in turn may support the differential assembly 64.

Additional components that may be associated with the differential assembly 64 may include an input yoke 86, an input shaft 88, a drive pinion 90, an output shaft 92, and an output yoke 94.

Referring to FIG. 2, the input yoke 86 may facilitate coupling of the axle assembly 32 to a torque source. For example, the input yoke 86 may be coupled to the drive shaft. The input yoke 86 may be disposed on the input shaft 88, the input shaft 88 being best shown in FIG. 3. For example, the input yoke 86 may have an opening that receives the input shaft 88 and may be secured to the input shaft 88 with a nut.

Referring to FIGS. 2 and 3, the input shaft 88 may extend along and may be configured to rotate about a first axis 100. For example, the input shaft 88 may be rotatably supported by one or more roller bearing assemblies 110 that may be disposed on the differential carrier 72. The input shaft 88 may be part of the interaxle differential assembly 62 or may be operatively connected to the interaxle differential assembly 62. For instance, the input shaft 88 may be integrally formed with a case of the interaxle differential assembly 62 or may be provided as a separate component that is fixedly coupled to the case in one or more approaches.

Referring to FIG. 3, the drive pinion 90 may provide torque to a ring gear 116 that may be provided with the differential assembly 64. The drive pinion 90 may extend along and may be configured to rotate about a first axis 100. The ring gear 116 may rotate about a second axis 102. The drive pinion 90 may be coaxially disposed with the input shaft 88 and may be spaced apart from the input shaft 88. The drive pinion 90 may be rotatably supported by one or more roller bearing assemblies 112 that may be disposed on the differential carrier 72. In FIG. 3, two roller bearing assemblies 112 are shown that are spaced apart from each other and separated by a spacer ring 118 that may extend around the drive pinion 90. In at least one approach, the drive pinion 90 may include a shaft portion 130 and a gear portion 132. The shaft portion 130 may extend from the interaxle differential assembly 62 to the gear portion 132.

Figure 6:
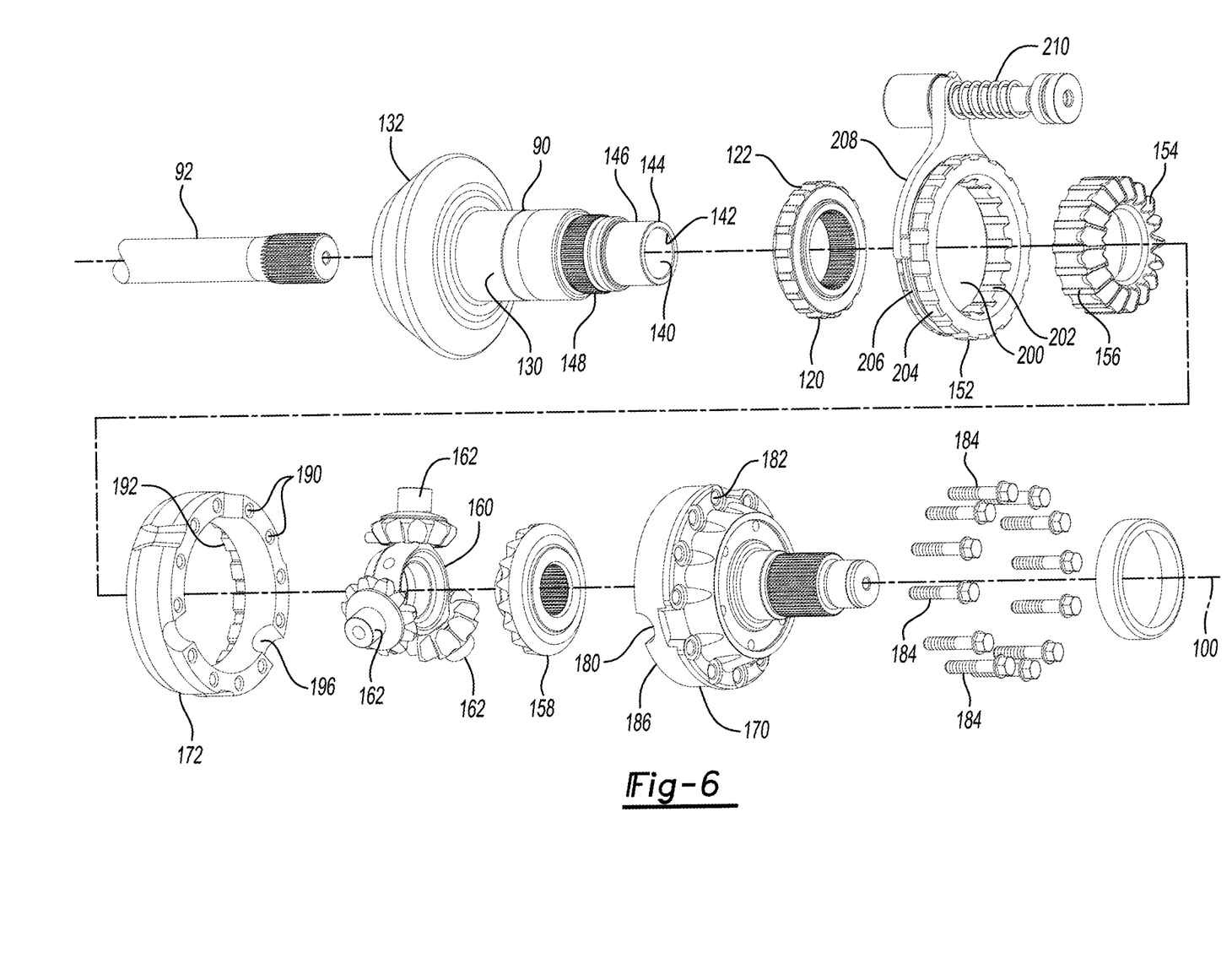
FIGS. 6 and 7 are exploded views of a portion of the differential assembly of FIGS. 4 and 5 with some components omitted for clarity.

As is best shown with reference to FIG. 6, the shaft portion 130 may include an inner drive pinion surface 140, a drive pinion passage 142, a drive pinion end surface 144, a drive pinion outer surface 146, and a drive pinion spline 148. The inner drive pinion surface 140 may be spaced apart from the first axis 100 and may be radially disposed with respect to the first axis 100. For example, the inner drive pinion surface 140 may be an inside circumference of the drive pinion 90. The inner drive pinion surface 140 may be spaced apart from and may not engage the output shaft 92. The inner drive pinion surface 140 may extend completely through the drive pinion 90 and may define the drive pinion passage 142.

The drive pinion passage 142 may extend along the first axis 100. The output shaft 92 may extend through the drive pinion passage 142.

The drive pinion end surface 144 may be disposed at an end of the shaft portion 130. The drive pinion end surface 144 may extend from the inner drive pinion surface 140 to the drive pinion outer surface 146. The drive pinion end surface 144 may be received in a spider of the interaxle differential assembly 62, as will be discussed in more detail below.

The drive pinion outer surface 146 may extend from the drive pinion end surface 144 toward or to the drive pinion spline 148. In at least one embodiment, the drive pinion outer surface 146 may face away from the first axis 100 and may be an outside circumference of a portion of the shaft portion 130. The drive pinion outer surface 146 may support a stabilizer bearing of the interaxle differential assembly 62 as will be discussed in more detail below.

The drive pinion spline 148 may include a plurality of teeth. The teeth may be disposed substantially parallel to the first axis 100 and may mate with a corresponding spline on a pinion collar 120 of the interaxle differential assembly 62 as will be discussed in more detail below.

The gear portion 132 may be disposed at an end of the shaft portion 130. The gear portion 132 may have a plurality of teeth that may mate with corresponding teeth on the ring gear 116. The gear portion 132 may be integrally formed with the shaft portion 130 or may be provided as a separate component that may be fixedly disposed on the shaft portion 130 in one or more embodiments.

Referring to FIGS. 2 and 3, the output shaft 92 may extend along and may be configured to rotate about the first axis 100. For instance, the output shaft 92 may be supported by one or more roller bearings that may be disposed on the housing assembly 60. The output shaft 92 may extend through the drive pinion 90 and the drive pinion passage 142. In addition, the output shaft 92 may extend through a spider of the interaxle differential assembly 62, as will be discussed in more detail below. The output shaft 92 may be coupled to the interaxle differential assembly 62 at a first end. For example, the output shaft 92 may be fixedly coupled to a second side gear of the interaxle differential assembly 62. The output shaft 92 may be fixedly coupled to the output yoke 94 at a second end that may be disposed opposite the first end.

Referring to FIG. 2, the output yoke 94 may facilitate coupling of the output shaft 92 to a second axle assembly that may be disposed in series with the axle assembly 32. For instance, the output yoke 94 may be coupled to a connecting shaft, such as a prop shaft, which in turn may be operatively connected to the second axle assembly.

Referring to FIG. 3, the interaxle differential assembly 62 may operatively connect the input shaft 88 to the drive pinion 90 and/or the output shaft 92. The interaxle differential assembly 62 may compensate for speed differences between different drive axle assemblies, such as speed differences between the axle assembly 32 and a second axle assembly.

Figure 4:
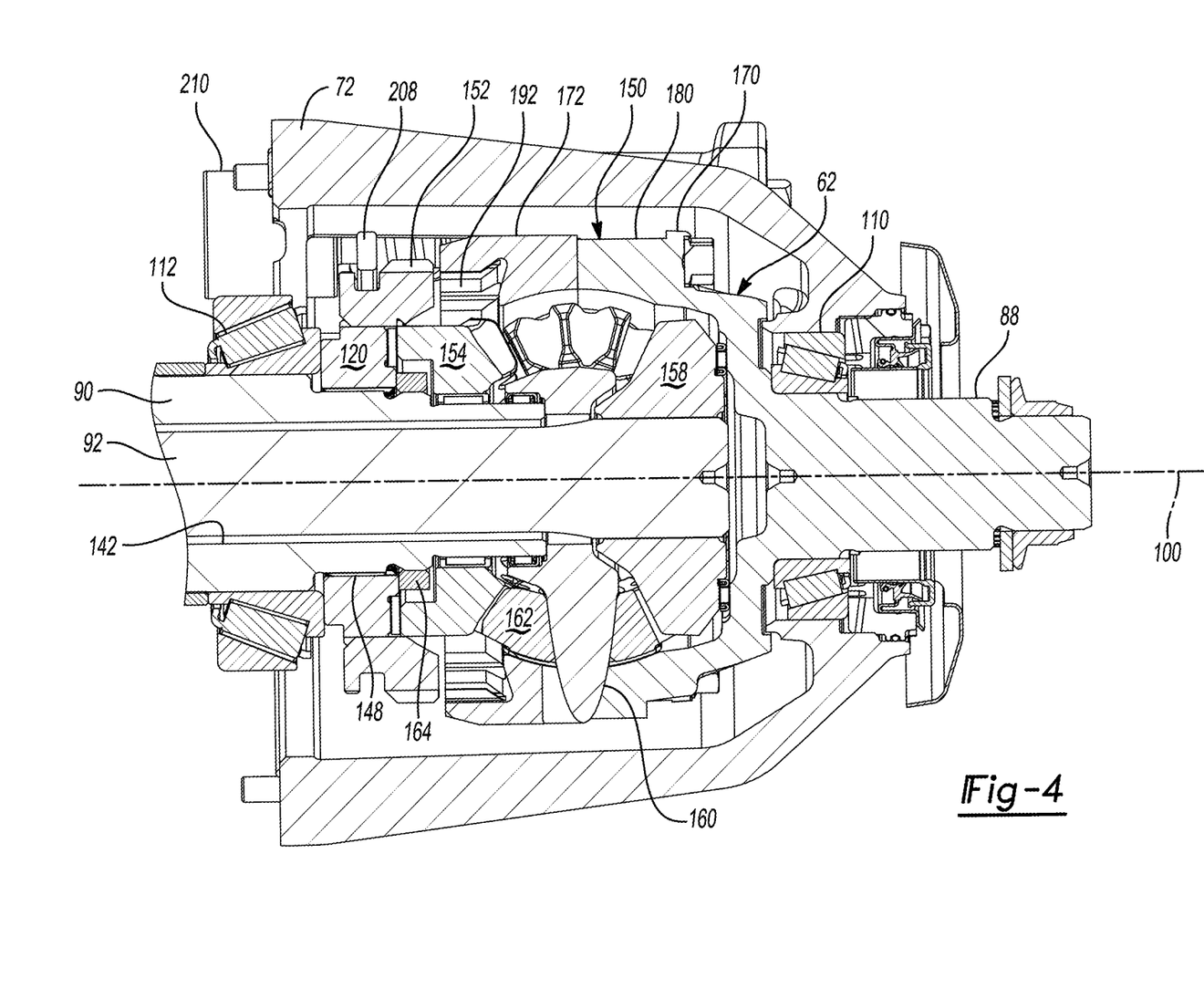
FIG. 4 is a magnified section view of a portion of FIG. 3 with a clutch collar in a first position.
Figure 5:
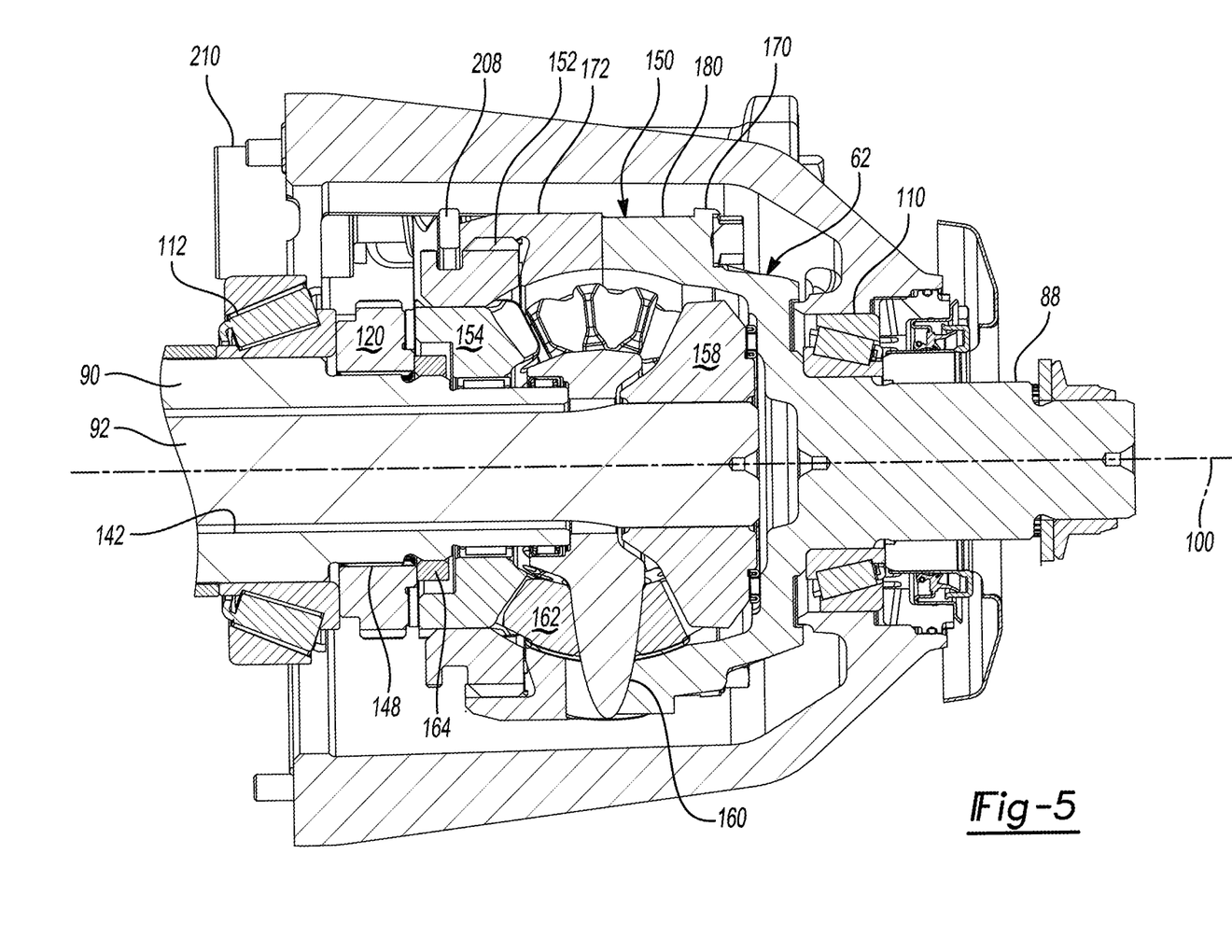
FIG. 5 is the magnified sectioned view of FIG. 4 with the clutch collar in a second position.

Referring to FIGS. 4 and 5, the interaxle differential assembly 62 may include a case 150, a pinion collar 120, a clutch collar 152, a rotatably drivable member such as a first side gear 154 having a plurality of teeth 156, a second side gear 158, a spider 160, and a plurality of pinion gears 162. A preload nut 164 may be threaded onto the drive pinion 90 and may be rotated to exert a desired preload force on the pinion collar 120. One or more bearings (e.g., thrust bearings and stabilizer bearings) may also be provided.

The pinion collar 120 may be rotatably fixed to the drive pinion 90. The pinion collar 120 may include an internal spline to permit the pinion collar 120 to be internally splined to the drive pinion 90; for example, at the drive pinion spline 148. In this way, angular rotation of the pinion collar 120 may effect a corresponding angular rotation of the drive pinion 90.

The pinion collar 120 may also include an outer spline arrangement 122 (which may be referred to herein as a first outer spline arrangement) to permit the pinion collar 120 to be selectively externally splined, as discussed in more detail below. In at least one approach, the pinion collar 120 is disposed on the drive pinion 90 such that an end region of the pinion collar 120 is adjacent, or substantially adjacent, to the rotatably drivable member (e.g., the first side gear 154). In at least one approach, an outer diameter of the pinion collar 120 at the outer spline arrangement 122 may be the same, or substantially the same, as an outer diameter of the first side gear 154 at the teeth 156 (which may be referred to herein as a second outer spline arrangement).

Figure 7:
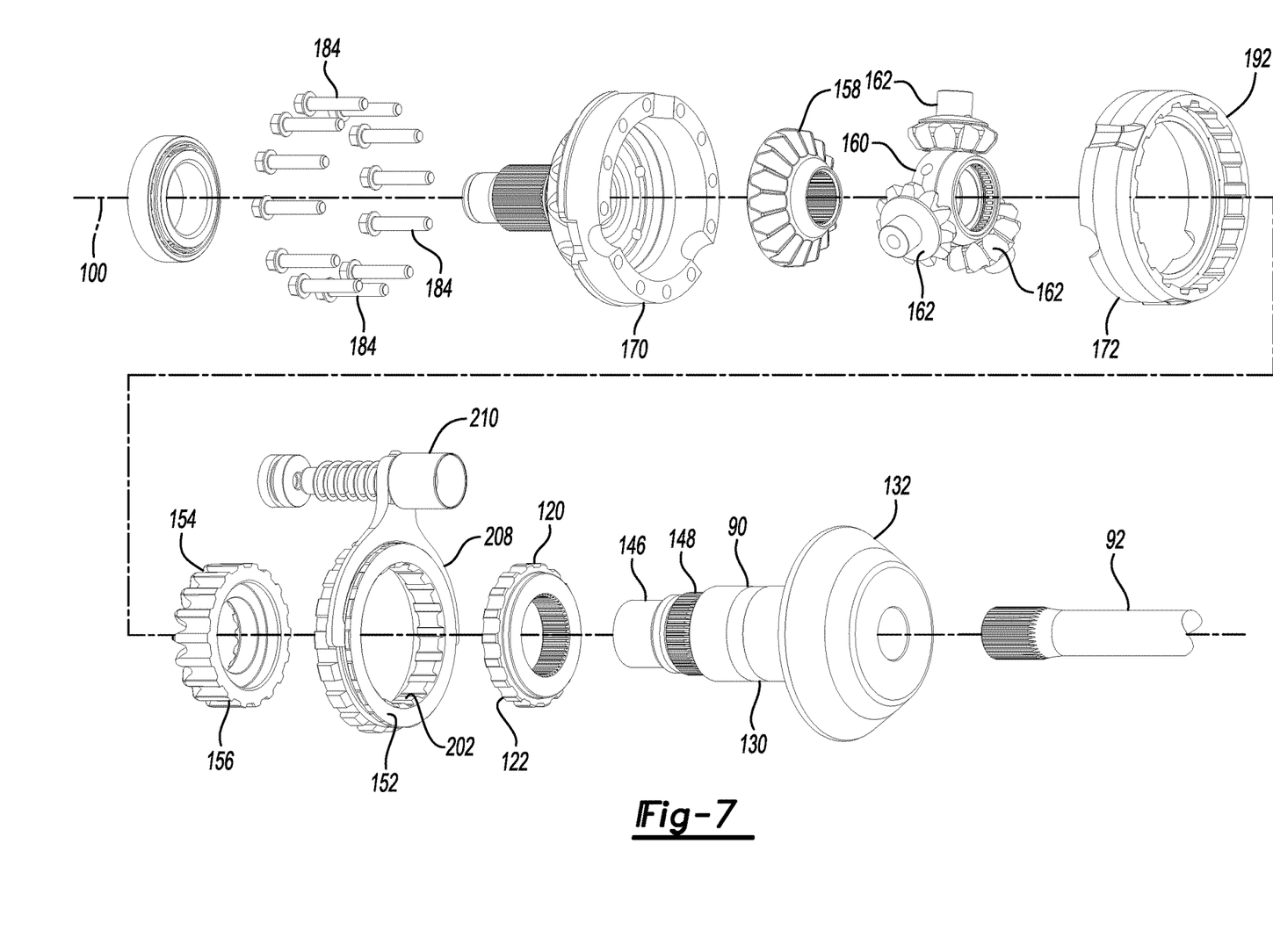

The case 150 may be configured to receive components of the interaxle differential assembly 62. In addition, the case 150 may be rotatable about the first axis 100. In at least one approach, the case 150 may include a first case portion 170 and a second case portion 172. In the configuration shown, the first case portion 170 is configured as a unitary or one piece component that includes the input shaft 88 and a first spider receiving portion 180. As is best shown in FIGS. 6 and 7, the first case portion 170 may include a plurality of fastener holes 182 that may be arranged around the first axis 100. Each fastener holes 182 may be configured as a through hole that may receive a corresponding fastener 184, such as a bolt, that may fixedly couple the first case portion 170 to the second case portion 172. The first and second case portions 170, 172 may cooperate to at least partially define a cavity. The cavity may receive at least a portion of the interaxle differential assembly 62 (e.g., the first side gear 154, second side gear 158, spider 160, and pinion gears 162).

The first spider receiving portion 180 may extend away from the first axis 100 and toward the second case portion 172. As is best shown in FIGS. 4 and 5, the first spider receiving portion 180 may extend around a portion of the interaxle differential assembly 62. The first spider receiving portion 180 may also include a first end surface 186 that may face toward and may engage the second case portion 172.

The second case portion 172 may be disposed opposite the first case portion 170 and may receive at least a portion of the interaxle differential assembly 62. The second case portion 172 may be configured as a ring that may extend around the first axis 100 and may include plurality of fastener holes 190 and an annular spline 192.

The fastener holes 190 may be aligned with corresponding fastener holes 182 on the first case portion 170 and may receive a corresponding fastener 184. The fastener holes 190 may extend from a second end surface 196 that may face toward and may engage the first end surface 186.

The annular spline 192 may be disposed opposite the second end surface 196. As is best shown in FIG. 6, the annular spline 192 may include a plurality of teeth that may be disposed about an aperture of the second case portion 172 around the first axis 100. The teeth may extend toward the first axis 100.

Referring to FIGS. 4-7, the clutch collar 152, which may also be referred to as a lock collar, may be moveably disposed on the first side gear 154. The clutch collar 152 may move axially or move along the first axis 100 between a first position and a second position as will be discussed in more detail below. As is best shown in FIGS. 6 and 7, the clutch collar 152 may be generally ring-shaped and may include a clutch collar hole 200, an inner spline interface 202, an outer spline interface 204, and a clutch collar groove 206.

The clutch collar hole 200 may extend through the clutch collar 152 and extend around the first axis 100. The inner spline interface 202 may be a spline that may extend into the clutch collar hole 200 and toward the first axis 100. The clutch collar hole 200 may receive the first side gear 154. For example, the inner spline interface 202 may mate with a corresponding spline (e.g., teeth 156) on the first side gear 154. As such, the mating splines may allow the clutch collar 152 to move in an axial direction or along the first axis 100 while inhibiting rotation of the clutch collar 152 about the first axis 100 with respect to the first side gear 154.

The clutch collar hole 200 may also receive the pinion collar 120 when the pinion collar 120 is disposed on the drive pinion 90. For example, the inner spline interface 202 may mate with a corresponding spline on the pinion collar 120. As such, the mating splines may allow the clutch collar 152 to move in an axial direction or along the first axis 100 while inhibiting rotation of the clutch collar 152 about the first axis 100 with respect to the pinion collar 120.

The outer spline interface 204 may include a set of teeth that may be arranged around the first axis 100 and may extend away from the first axis 100. The outer spline interface 204 may be radially aligned, or substantially radially aligned, with the annular spline 192 of the second case portion 172. As used herein, radially alignment refers to a common distance from the first axis 100. In this way, the set of teeth may selectively engage the teeth of the annular spline 192 of the second case portion 172 depending on the position of the clutch collar 152.

The clutch collar groove 206 may extend around the first axis 100 and may face away from the first axis 100. The clutch collar groove 206 may receive a shift fork 208, which is best shown in FIGS. 6 and 7, that may operatively connect the clutch collar 152 to an actuator 210. The actuator 210 may move the clutch collar 152 between first and second positions. The actuator 210 may be of any suitable type, such as a pneumatic, hydraulic, vacuum, mechanical, or electromechanical actuator. In at least one approach, the actuator 210 may include a piston, a fork mounting feature, and a biasing member.

Referring to FIG. 4, in the first position, which may be referred to as the extended position, the actuator 210 may position the clutch collar 152 (e.g., via the shift fork 208) in a first axial location along the first axis 100 such that the clutch collar 152 may engage both the first side gear 154 and the pinion collar 120. More particularly, when in the first position, the inner spline interface 202 of the clutch collar 152 may be splined with the teeth 156 of the first side gear 154 as well as the pinion collar 120, which may be rotatably fixed to the drive pinion 90 at the drive pinion spline 148. As such, the first side gear 154 and the pinion collar 120 may be provided with corresponding spline interfaces (e.g., common number of teeth, common depth of teeth, common thickness of teeth, common spacing of teeth, etc.).

In this way, when the clutch collar 152 is in the first position, the drive pinion 90 may be rotationally locked to the first side gear 154 such that rotation of the first side gear 154 effects a corresponding rotation of the drive pinion 90. As previously described, rotation of the drive pinion 90 about the first axis 100 effects a rotation of the ring gear 116 about the second axis 102. As such, and referring momentarily to FIG. 1, when the clutch collar 152 is in the first position, torque may be transferred from the axle assembly 32 to connected traction wheel assemblies 24. Also when the clutch collar 152 is in the first position, the interaxle differential assembly 62 may compensate for speed differences between different drivetrain components, such as speed differences between the drive shaft 36 and the prop shaft 38.

In various circumstances, an operator may choose to disconnect the transfer of torque to the traction wheel assemblies 24 connected to axle assembly 32. The operator may further choose to inhibit rotation of the drive pinion 90 when torque is disconnected from the traction wheel assemblies 24 of the axle assembly 32. Disengagement of the axle assembly 32 may provide an opportunity for reducing energy consumption and improving vehicle fuel economy. In addition, disengagement of an axle assembly may improve durability and life of the axle assembly and its components due to decreased operation and wear.

As such, referring to FIG. 5, the actuator 210 may be adapted to axially displace the clutch collar 152 (e.g., via the shift fork 208) to the second position, which may be referred to as the retracted position, at a second axial location along the first axis 100. The second axial location may be axially offset from the first axial location. In the second position, the clutch collar 152 may engage the first side gear 154, but does not engage the pinion collar 120. More particularly, when in the second position, the inner spline interface 202 of the clutch collar 152 may be splined with the teeth 156 of the first side gear 154, but may be disconnected from the pinion collar 120. In this way, when the clutch collar 152 is in the second position, the drive pinion 90 may rotate independently of the first side gear 154 such that rotation of the first side gear 154 does not effect a corresponding rotation of the drive pinion 90. As such, and referring momentarily to FIG. 1, when the clutch collar 152 is in the second position, torque may not be transferred from the axle assembly 32 to connected traction wheel assemblies 24.

Also when the clutch collar 152 is in the second position, the teeth of the outer spline interface 204 of the clutch collar 152 may be splined with the teeth of the annular spline 192 of the second case portion 172. As such, when the clutch collar 152 is in the second position, the clutch collar 152 may be splined to both the first side gear 154 (e.g., at teeth 156 via the inner spline interface 202 of the clutch collar 152) and the second case portion 172 (e.g., at annular spline 192 via the outer spline interface 204 of the clutch collar 152). In this way, the first side gear 154 may be rotationally locked to the second case portion 172. Rotationally locking the first side gear 154 to the second case portion 172 may cause the clutch collar 152, the first side gear 154, the spider 160, the second side gear 158 and the output shaft 92 to rotate in unison. In this way, an angular velocity of the output shaft 92 may be substantially synchronized with an angular velocity of the input shaft 88. Referring momentarily to FIG. 1, such locking may effectively eliminate the differential which typically exists between the drive shaft 36 and the prop shaft 38.

In still another approach, the pinion collar 120 may be omitted. In this approach, the clutch collar 152 may directly engage the drive pinion 90 at an exterior surface of the drive pinion 90. The exterior surface of the drive pinion 90 may include a drive pinion spline (e.g., similar to drive pinion spline 148 but having a larger diameter).

Referring to FIGS. 8-11, a second approach for an interaxle differential assembly 250 is shown. The interaxle differential assembly 250 may include a planetary gear set 252. The planetary gear set 252 may be received in the differential carrier 72. In at least one approach, the planetary gear set 252 may include a rotatably drivable member such as a sun gear 260, a plurality of planet pinions 262, a planetary ring gear 264, and a planet carrier 266.

Figure 8:
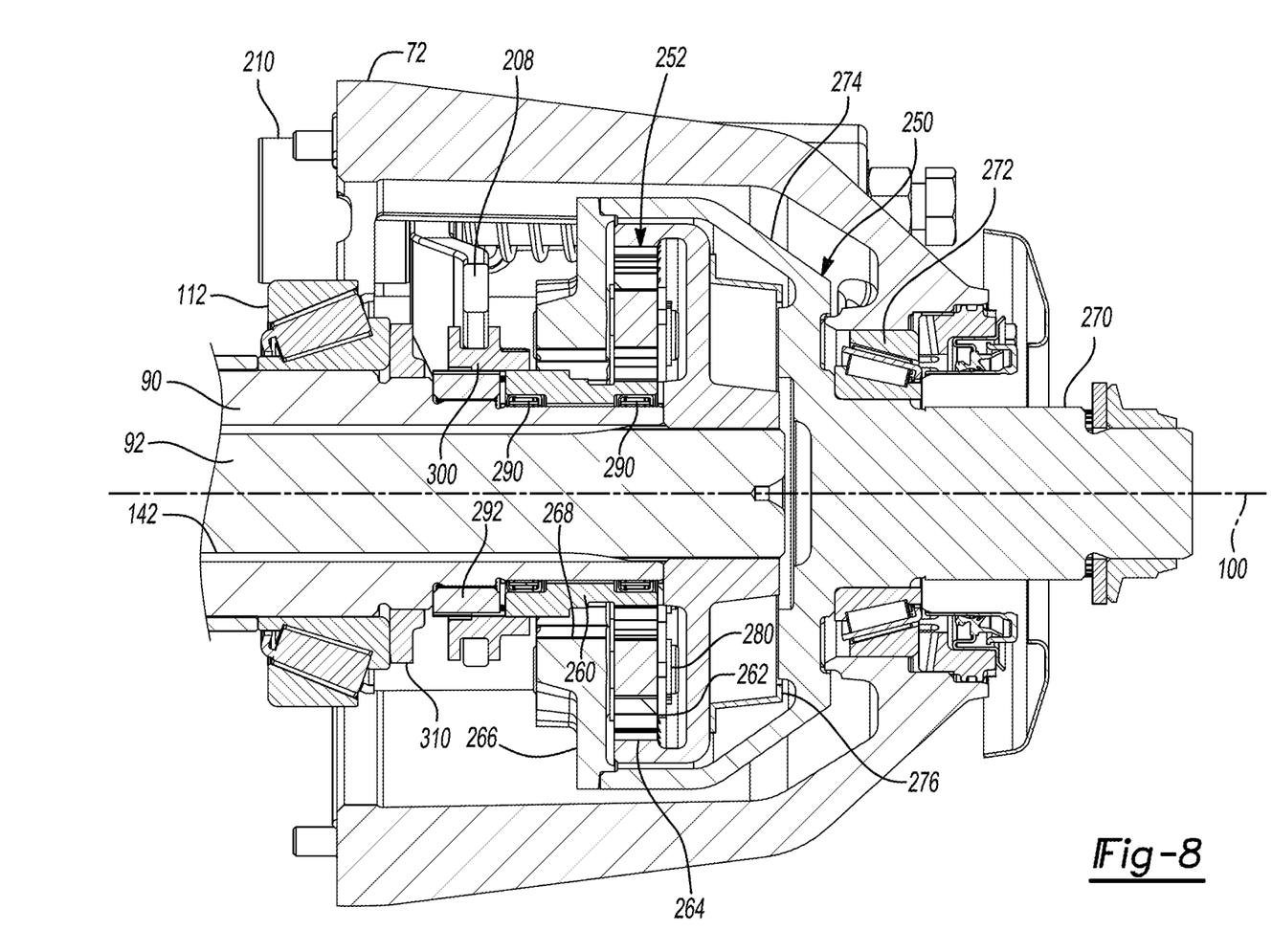
FIG. 8 is a section view of a second approach that includes a differential assembly having a planetary gear set and a clutch collar in a first position.
Figure 9:
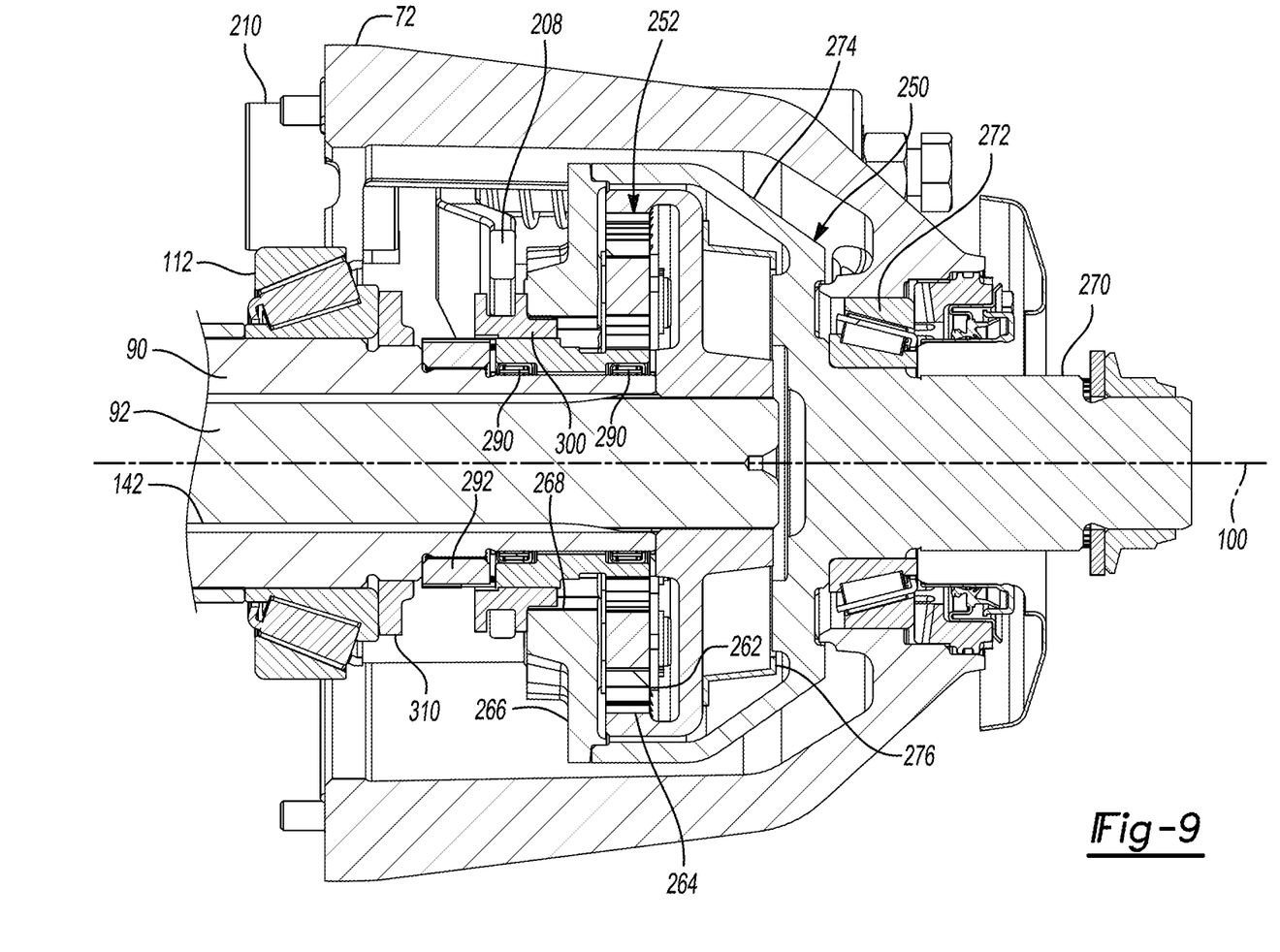
FIG. 9 is the section view of FIG. 8 with the clutch collar in a second position.

An input shaft 270 may extend along and may be configured to rotate about a first axis 100. For example, the input shaft 270 may be rotatably supported by one or more roller bearing assemblies 272 that may be disposed on the differential carrier 72. The input shaft 270 may be part of the interaxle differential assembly 250 or may be operatively connected to the interaxle differential assembly 250. For instance, the input shaft 270 may be integrally formed with a case of the interaxle differential assembly 250 or may be provided as a separate component that is fixedly coupled to the case in one or more approaches.

A case portion 274 may be configured to receive components of the interaxle differential assembly 250. In at least one approach, the case portion 274 may be integrally formed with the input shaft 270. In addition, the case portion 274 may be rotatable about the first axis 100.

In at least one approach, the planet carrier 266 may be welded to the case portion 274. Other suitable approaches (such as the use of fasteners) for securing the planet carrier 266 to the case portion 274 may be used.

The case portion 274 and the planet carrier 266 may cooperate to at least partially define a cavity. The cavity may at least partially receive the sun gear 260, the plurality of planet pinions 262, the planetary ring gear 264, and an oil catch 276. The planet carrier 266 may be fixedly secured to the case portion 274 such that rotation of the case portion 274 about the first axis 100 (e.g., via rotation of the input shaft 270) may affect a corresponding rotation of the planet carrier 266.

Figure 10:
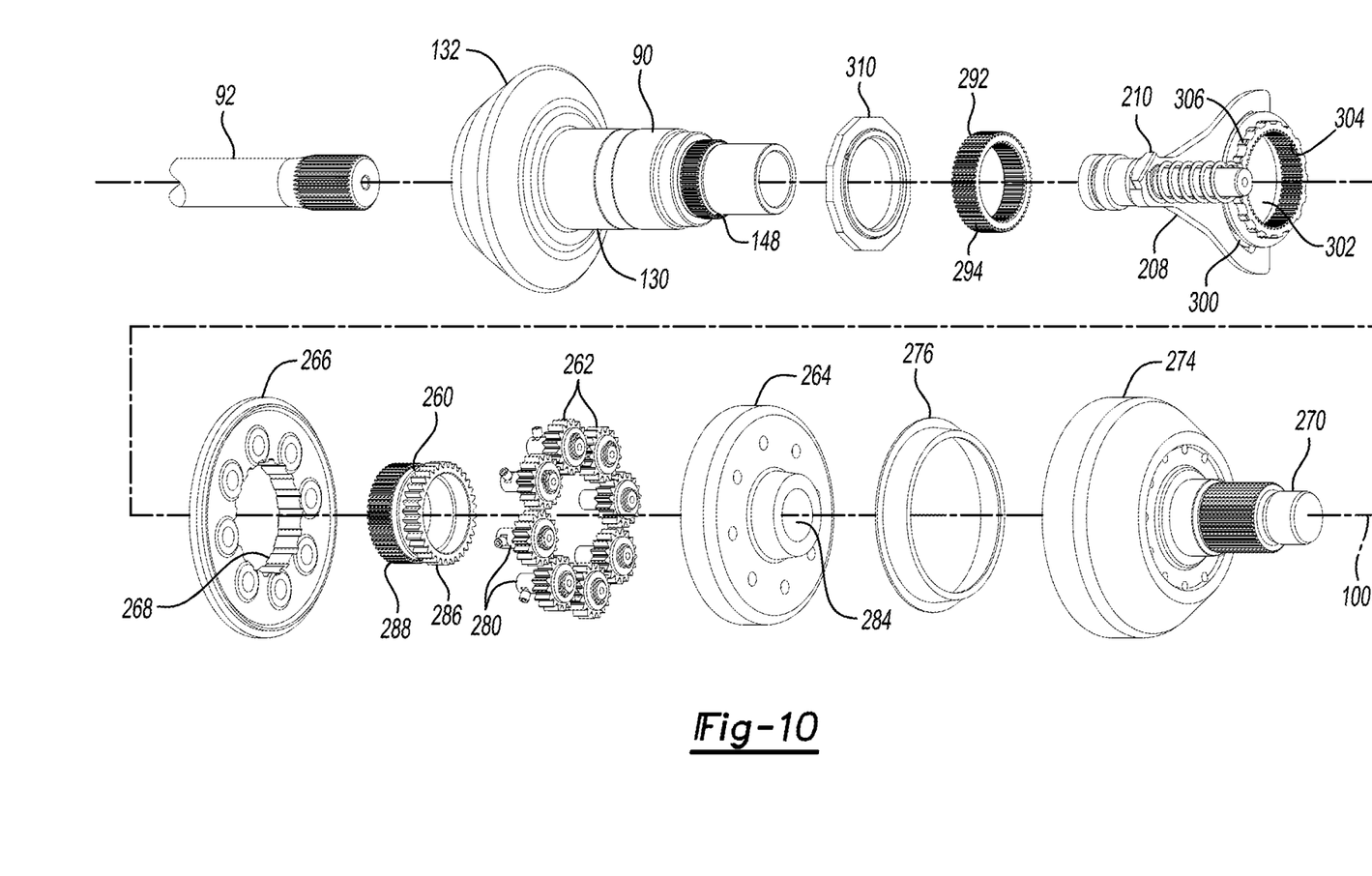
FIGS. 10 and 11 are exploded views of a portion of the differential assembly of FIGS. 8 and 9 with some components omitted for clarity.
Figure 11:
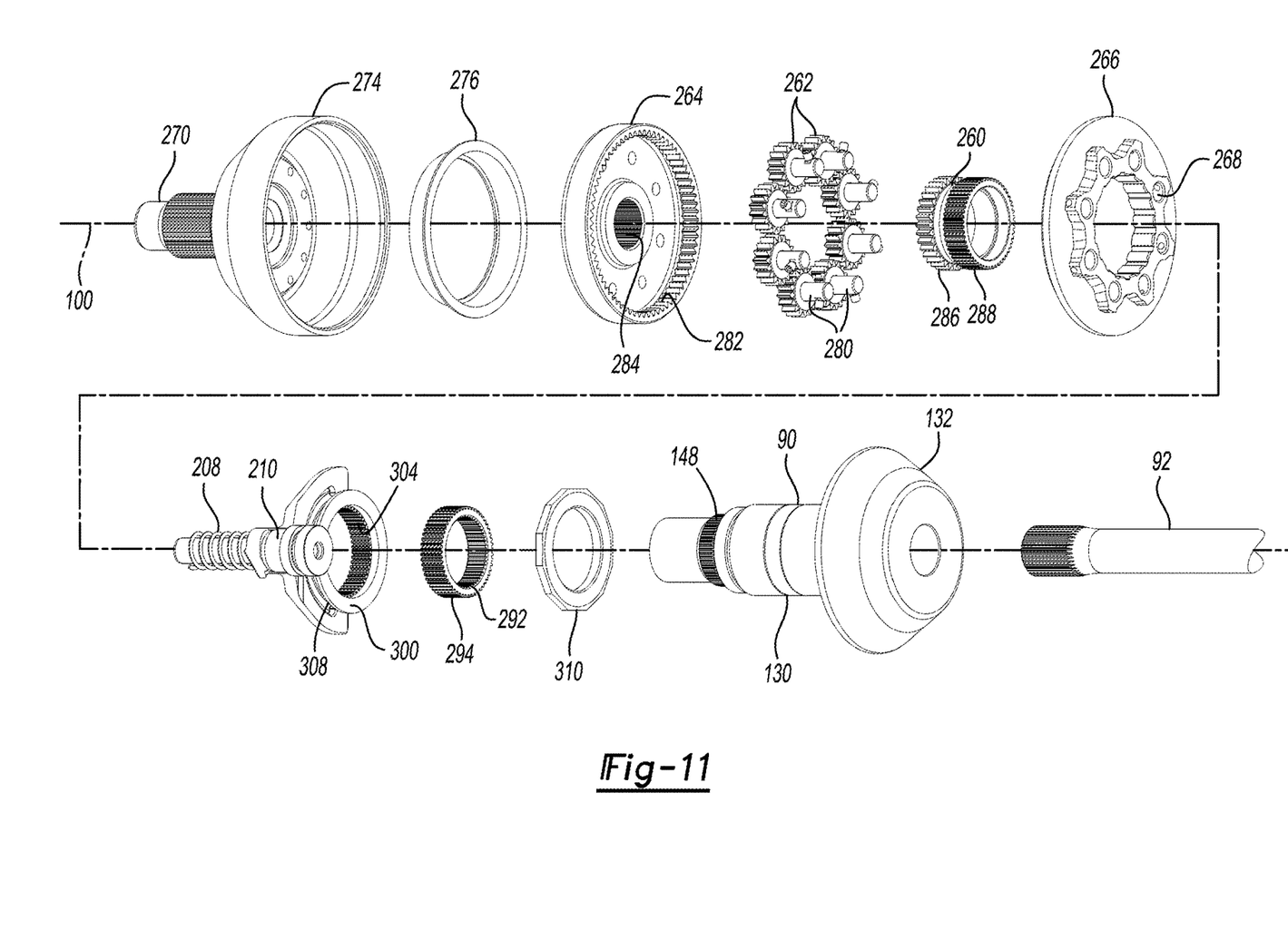

The planet carrier 266 may be coupled to the planet pinions 262 and may be rotatable about the first axis 100. The planet carrier 266 may include a case portion defining one or more holes for receiving pins 280 for supporting the planet pinions 262. The case portion may also define an annular spline 268. As is best shown in FIGS. 10 and 11, the annular spline 268 may include a plurality of teeth that may be disposed about an aperture of the planet carrier 266 around the first axis 100.

The planet pinions 262 may be spaced apart from each other and may be rotatably disposed between the sun gear 260 and the planetary ring gear 264. Each planet pinion 262 may have a set of teeth and a planet pinion hole for receiving the pins 280. The planet pinion hole may be a through hole that may extend through the planet pinion 262. The set of teeth may be disposed opposite the planet pinion hole. Each planet pinion 262 may be configured to rotate about a different planet pinion axis. The planet pinion axes may extend substantially parallel to the first axis 100. The set of teeth may mesh with teeth on the sun gear 260 and a set of teeth 282 (shown in FIGS. 10 and 11) on the planetary ring gear 264.

The planetary ring gear 264 may extend around the first axis 100 and may receive the planet pinions 262. As described, the planet pinions 262 may engage the planetary ring gear 264 at the set of teeth 282 of the planetary ring gear 264. The set of teeth 282 may extend toward the first axis 100.

The planetary ring gear 264 may also include a spline interface 284 that may extend toward the first axis 100. The spline interface 284 may engage a corresponding spline interface on the output shaft 92. In this way, rotation of the planetary ring gear 264 about the first axis 100 may affect a corresponding rotation of the output shaft 92.

The sun gear 260 may be disposed proximate the center of the planetary gear set 252 and may be rotatable about the first axis 100. The sun gear 260 have a hole that may receive the drive pinion 90. The sun gear 260 may include a first spline interface 286 and a second spline interface 288. The first spline interface 286 may meshingly engage or be in meshing engagement with the planet pinions 262. As shown in FIGS. 8 and 9, one or more roller bearings 290 may be provided to permit rotation of the sun gear 260 relative to the drive pinion 90.

The interaxle differential assembly 250 may further include a pinion collar 292. The pinion collar 292 may be rotatably fixed to the drive pinion 90. For example, the pinion collar 292 may include an internal spline to permit the pinion collar 292 to be internally splined to the drive pinion 90; for example, at the drive pinion spline 148. In this way, angular rotation of the pinion collar 120 may affect a corresponding angular rotation of the drive pinion 90.

The pinion collar 292 may also include an outer spline arrangement 294 (which may be referred to herein as a first outer spline arrangement) to permit the pinion collar 292 to be selectively externally splined, as discussed in more detail below. In at least one approach, the pinion collar 292 is disposed on the drive pinion 90 such that an end region of the pinion collar 292 is adjacent, or substantially adjacent, to the rotatably drivable member (e.g., the sun gear 260). In at least one approach, an outer diameter of the pinion collar 292 at the outer spline arrangement 294 may be the same, or substantially the same, as an outer diameter of the sun gear 260 at the second spline interface 288 (which may be referred to herein as a second outer spline arrangement).

The interaxle differential assembly 250 may further a clutch collar 300, which may also be referred to as a lock collar. The clutch collar 300 may be moveably disposed on the sun gear 260. The clutch collar 300 may move axially or move along the first axis 100 between a retracted position and an extended position as will be discussed in more detail below. As is best shown in FIGS. 6 and 7, the clutch collar 300 may be generally ring-shaped and may include a clutch collar hole 302, an inner spline interface 304, an outer spline interface 306, and a clutch collar groove 308. A preload nut 310 may be threaded onto the drive pinion 90 and may be rotated to exert a desired preload force on the roller bearing assemblies 112.

The clutch collar hole 302 may extend through the clutch collar 300 and extend around the first axis 100. The inner spline interface 304 may be a spline that may extend into the clutch collar hole 302 and toward the first axis 100. The clutch collar hole 302 may receive the sun gear 260. For example, the inner spline interface 304 may mate with a corresponding spline (e.g., second spline interface 288) on the sun gear 260. As such, the mating splines may allow the clutch collar 300 to move in an axial direction or along the first axis 100 while inhibiting rotation of the clutch collar 300 about the first axis 100 with respect to the sun gear 260.

The clutch collar hole 302 may also receive the pinion collar 292 when the pinion collar 292 is disposed on the drive pinion 90. For example, the inner spline interface 304 may mate with a corresponding spline on the pinion collar 292. As such, the mating splines may allow the clutch collar 300 to move in an axial direction or along the first axis 100 while inhibiting rotation of the clutch collar 300 about the first axis 100 with respect to the pinion collar 292.

The outer spline interface 306 may include a set of teeth that may be arranged around the first axis 100 and may extend away from the first axis 100. The outer spline interface 306 may be radially aligned, or substantially radially aligned, with the annular spline 268 of the planet carrier 266. As used herein, radially alignment refers to a common distance from the first axis 100. In this way, the set of teeth may selectively engage the teeth of the annular spline 268 of the planet carrier 266 depending on the position of the clutch collar 300.

The clutch collar groove 308 may extend around the first axis 100 and may face away from the first axis 100. The clutch collar groove 308 may receive a shift fork 208, which is best shown in FIGS. 10 and 11, that may operatively connect the clutch collar 300 to an actuator 210. The actuator 210 may move the clutch collar 300 between first and second positions. The actuator 210 may be of any suitable type, such as a pneumatic, hydraulic, vacuum, mechanical, or electromechanical actuator. In at least one approach, the actuator 210 may include a piston, a fork mounting feature, and a biasing member.

Referring to FIG. 8, in the first position, which may be referred to as the extended position, the actuator 210 may position the clutch collar 300 (e.g., via the shift fork 208) in a first position along the first axis 100 such that the clutch collar 300 may engage both the first side gear 154 and the pinion collar 292. More particularly, when in the first position, the inner spline interface 304 of the clutch collar 300 may be splined with the second spline interface 288 of the sun gear 260 as well as the pinion collar 292, which may be rotatably fixed to the drive pinion 90 at the drive pinion spline 148. As such, the second spline interface 288 and the pinion collar 292 may be provided with corresponding spline interfaces (e.g., common number of teeth, common depth of teeth, common thickness of teeth, common spacing of teeth, etc.).

In this way, when the clutch collar 300 is in the first position, the drive pinion 90 may be rotationally locked to the sun gear 260 such that rotation of the sun gear 260 effects a corresponding rotation of the drive pinion 90. As previously described, rotation of the drive pinion 90 about the first axis 100 effects a rotation of a ring gear (e.g., ring gear 116 of FIG. 2). As such, and referring momentarily to FIG. 1, when the clutch collar 300 is in the first position, torque may be transferred from the axle assembly 32 to connected traction wheel assemblies 24. Also when the clutch collar 300 is in the first position, the interaxle differential assembly 62 may compensate for speed differences between different drivetrain components, such as speed differences between the drive shaft 36 and the prop shaft 38.

In various circumstances, an operator may choose to disconnect the transfer of torque to the traction wheel assemblies 24 connected to axle assembly 32. The operator may further choose to inhibit rotation of the drive pinion 90 when torque is disconnected from the traction wheel assemblies 24 of the axle assembly 32. Disengagement of the axle assembly 32 may provide an opportunity for reducing energy consumption and improving vehicle fuel economy. In addition, disengagement of an axle assembly may improve durability and life of the axle assembly and its components due to decreased operation and wear.

As such, referring to FIG. 8, the actuator 210 may be adapted to axially displace the clutch collar 300 (e.g., via the shift fork 208) to the second axial position, which may be referred to as the retracted position, at a second axial location along the first axis 100. The second axial location may be axially offset from the first axial location. In the second axial position, the clutch collar 300 may engage the sun gear 260, but does not engage the pinion collar 292. More particularly, when in the second axial position, the inner spline interface 304 of the clutch collar 300 may be splined with the second spline interface 288 of the sun gear 260, but may be disconnected from the pinion collar 292. In this way, when the clutch collar 300 is in the second axial position, the drive pinion 90 may rotate independently of the sun gear 260 such that rotation of the sun gear 260 does not effect a corresponding rotation of the drive pinion 90. As such, and referring momentarily to FIG. 1, when the clutch collar 300 is in the second axial position, torque may not be transferred from the axle assembly 32 to connected traction wheel assemblies 24.

Also when the clutch collar 300 is in the second axial position, the teeth of the outer spline interface 306 of the clutch collar 300 may be splined with the teeth of the annular spline 268 of the planet carrier 266. As such, when the clutch collar 300 is in the second axial position, the clutch collar 300 may be splined to both the sun gear 260 (e.g., at second spline interface 288 via the inner spline interface 304 of the clutch collar 300) and the planet carrier 266 (e.g., at annular spline 268 via the outer spline interface 306 of the clutch collar 300). In this way, the sun gear 260 may be rotationally locked to the planet carrier 266. Rotationally locking the sun gear 260 to the planet carrier 266 may cause the clutch collar 300, the sun gear 260, the planet pinions 262, the planetary ring gear 264, and the planet carrier 266 to rotate in unison. In this way, an angular velocity of the output shaft 92 may be substantially synchronized with an angular velocity of the input shaft 270. Referring momentarily to FIG. 1, such locking may effectively eliminate the differential which typically exists between the drive shaft 36 and the prop shaft 38.

In still another approach, the pinion collar 292 may be omitted. In this approach, the clutch collar 300 may directly engage the drive pinion 90 at an exterior surface of the drive pinion 90. The exterior surface of the drive pinion 90 may include a drive pinion spline (e.g., similar to drive pinion spline 148 but having a larger diameter).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   a housing assembly;
   a case that is disposed in the housing assembly and is rotatable about a first axis;
   an interaxle differential unit that is disposed in the case and that has a rotatably drivable member;
   a drive pinion that is selectively connected to the interaxle differential unit and configured to provide torque to a differential assembly that includes a ring gear, wherein the drive pinion has a gear portion that has teeth that mate with teeth of the ring gear;
   an output shaft that is received in the drive pinion and that is operatively connected to the interaxle differential unit; and
   a clutch collar that is moveable along the first axis between a first position in which the rotatably drivable member is rotatable with respect to the case and the rotatably drivable member and drive pinion are configured to rotate together about the first axis, and a second position in which the rotatably drivable member is not rotatable with respect to the case and the rotatably drivable member and the case are rotatable with respect to the drive pinion.

2. The axle assembly of claim 1 wherein when the clutch collar is in the first position, the drive pinion provides torque to the differential assembly and the interaxle differential unit is unlocked, and wherein when the clutch collar is in the second position, the drive pinion does not provide torque to the differential assembly and the interaxle differential unit is locked.

3. The axle assembly of claim 1 wherein the rotatably drivable member is a first side gear, and wherein the interaxle differential unit further includes:
   a second side gear splined to the output shaft;
   a spider secured to the case; and
   a plurality of pinion gears that are rotatably disposed on the spider and disposed in meshed engagement with the first and second side gears.

4. The axle assembly of claim 1 wherein the rotatably drivable member is a sun gear, and wherein the interaxle differential unit further comprises:
   a planetary ring gear; and
   a plurality of planet pinions that are rotatably supported by a planet carrier and are disposed in meshed engagement with the sun gear and the planetary ring gear.

5. An axle assembly comprising:
   a housing assembly;
   a case that is disposed in the housing assembly and is rotatable about a first axis, wherein the case includes a first case portion adapted to be rotated about the first axis by an input shaft, and a second case portion disposed on the first case portion, the second case portion defining an annular spline disposed about an aperture of the second case portion;
   an interaxle differential unit that is disposed in the case and that has a first side gear;
   a drive pinion that is selectively connected to the interaxle differential unit and configured to provide torque to a differential assembly;
   an output shaft that is received in the drive pinion and that is operatively connected to the interaxle differential unit; and
   a clutch collar that is moveable along the first axis between a first position in which the first side gear is rotatable with respect to the case and the first side gear and drive pinion are configured to rotate together about the first axis, and a second position in which the first side gear is not rotatable with respect to the case and the first side gear and the case are rotatable with respect to the drive pinion.

6. The axle assembly of claim 5 wherein a gear portion of the drive pinion meshes with a ring gear of the differential assembly.

7. The axle assembly of claim 5 wherein in the second position, the clutch collar is at least partially disposed between the first side gear and the annular spline of the second case portion.

8. The axle assembly of claim 5 wherein the clutch collar is coupled to the second case portion in the second position, and is decoupled from the second case portion in the first position.

9. The axle assembly of claim 8 wherein the clutch collar is disposed at least partially within the annular spline and in engagement with the annular spline in the second position, and is not disposed within the annular spline in the first position.

10. The axle assembly of claim 5 further comprising a pinion collar that is rotatably fixed to the drive pinion, wherein the clutch collar is axially movable into and out of engagement with the pinion collar.

11. The axle assembly of claim 10 wherein the pinion collar is axially positioned between a roller bearing assembly that rotatably supports the drive pinion and the first side gear.

12. The axle assembly of claim 10 further comprising a preload nut axially positioned between the pinion collar and the first side gear to inhibit axial movement of the pinion collar toward the first side gear.

13. An axle assembly comprising:
a housing assembly;
a case that is disposed in the housing assembly and is rotatable about a first axis, wherein the case includes a first case portion adapted to be rotated about the first axis by an input shaft and a planet carrier disposed on the first case portion, the planet carrier defining an annular spline disposed about an aperture of the planet carrier;
an interaxle differential unit that is disposed in the case and that has a sun gear;
a drive pinion that is selectively connected to the interaxle differential unit and configured to provide torque to a differential assembly;
an output shaft that is received in the drive pinion and that is operatively connected to the interaxle differential unit; and
a clutch collar that is moveable along the first axis between a first position in which the sun gear is rotatable with respect to the case and the sun gear and drive pinion are configured to rotate together about the first axis, and a second position in which the sun gear is not rotatable with respect to the case and the sun gear and the case are rotatable with respect to the drive pinion.

14. The axle assembly of claim 13 wherein a gear portion of the drive pinion meshes with a ring gear of the differential assembly.

15. The axle assembly of claim 13 wherein in the second position, the clutch collar is at least partially disposed between the sun gear and the annular spline of the planet carrier.

16. The axle assembly of claim 13 wherein the clutch collar is coupled to the planet carrier in the second position, and is decoupled from the planet carrier in the first position.

17. The axle assembly of claim 16 wherein the clutch collar is disposed at least partially within the annular spline and in engagement with the annular spline in the second position, and is not disposed within the annular spline in the first position.

18. The axle assembly of claim 13 further comprising a pinion collar that is rotatably fixed to the drive pinion, wherein the clutch collar is axially movable into and out of engagement with the pinion collar.

19. The axle assembly of claim 18 wherein the pinion collar is axially positioned between a roller bearing assembly that rotatably supports the drive pinion and the sun gear.

20. The axle assembly of claim 19 further comprising a preload nut axially positioned between the roller bearing assembly and the pinion collar to inhibit axial movement of the roller bearing assembly toward the pinion collar.

\* \* \* \* \*